United States Patent [19]

Georgopoulos

[11] Patent Number: 4,607,818

[45] Date of Patent: Aug. 26, 1986

[54] INSTALLATION BRACKET FOR VENETIAN BLIND HEAD RAIL

[75] Inventor: George Georgopoulos, Pine Brook, N.J.

[73] Assignee: Levolor Lorentzen, Inc., Lyndhurst, N.J.

[21] Appl. No.: 527,754

[22] Filed: Aug. 30, 1983

[51] Int. Cl.[4] .............................................. F16M 13/02

[52] U.S. Cl. .................................... 248/544; 248/251; 160/178 B

[58] Field of Search ............... 248/544, 251, 262, 254, 248/261, 264, 257, 259, 265; 160/178 B, 178 R

[56] References Cited

U.S. PATENT DOCUMENTS

| | | | |
|---|---|---|---|
| 2,875,805 | 3/1959 | Flora | 248/544 X |
| 4,224,974 | 9/1980 | Anderson et al. | 160/178 R |
| 4,411,401 | 10/1983 | Anderson | 248/251 X |
| 4,475,706 | 10/1984 | Anderson | 248/544 X |

FOREIGN PATENT DOCUMENTS

| | | | |
|---|---|---|---|
| 626705 | 9/1961 | Canada | 160/178 R |

*Primary Examiner*—Ramon S. Britts
*Assistant Examiner*—David M. Purol

[57] ABSTRACT

A bracket for mounting a U-shaped, flanged head rail of a venetian blind to a support, the bracket having a relatively flat top portion with a hole for a fastening screw and two side portions depending from the top portion with horizontal edges forming shelves for supporting the flanges of the head rail, and with diagonally opposite first vertical edges for guiding the flanges and with diagonally opposite second vertical edges spaced from the flanges sufficiently to permit the mounting bracket to be rotated when the head rail is to be removed from the bracket. The side portions are provided adjacent the second edges with upwardly, outwardly inclined edges permitting one of the flanges to ride up on the inclined edge and onto the support shelves while the other flange is already suspended from the bracket.

4 Claims, 9 Drawing Figures

INSTALLATION BRACKET FOR VENETIAN BLIND HEAD RAIL

BACKGROUND OF THE INVENTION

The present invention relates to venetian blinds, and more specifically to a bracket for mounting the head rail of a venetian blind to a support.

A large number of such brackets are known in the art, and by way of example, reference is made to U.S. Pat. Nos. 2,225,062; 2,518,923; 3,169,006; 2,674,432; and 4,224,974.

As will be evident from a perusal of these patents, installation brackets take various forms in order to serve a variety of different purposes and environments when mounting a venetian blind head rail to a support, such as a window frame or the like.

More specifically, it is an object of the present invention to provide an installation bracket for the head rail of a venetian blind, which bracket is inconspicuous, does not cover any part of the head rail, and does not extend beyond the front or back of the blind head so as to be applicable where the space for the mounting of the blind head is restricted.

Furthermore, it is an object of the present invention to provide an installation bracket which makes it possible to install a very narrow venetian blind between two panes of glass or between a pane of glass and a screen.

It is still another object of the present invention to provide an installation bracket which makes it possible to fasten the bracket in place first and then push the blind head onto the bracket.

Still furthermore, it is an object of the present invention to provide an installation bracket of the type described above in which the blind can be removed relatively easily by means of a simple instrument, such as a screwdriver.

BRIEF SUMMARY OF THE INVENTION

The installation bracket of the invention has a top portion with an opening for a screw for fastening the bracket to a support; two side portions of identical design, but turned by 180° with respect to each other and depending from the top portion. The side portions have diagonally opposite first edges for receiving and guiding therebetween the flanges of the blind head, and diagonally opposite second edges spaced away from the flanges, so as to permit rotating of the bracket when removal of the head becomes necessary.

BRIEF DESCRIPTION OF THE DRAWINGS

The invention is illustrated, by way of example, in the accompanying drawings, in which.

DETAILED DESCRIPTION OF PREFERRED EMBODIMENTS

Figure 1:
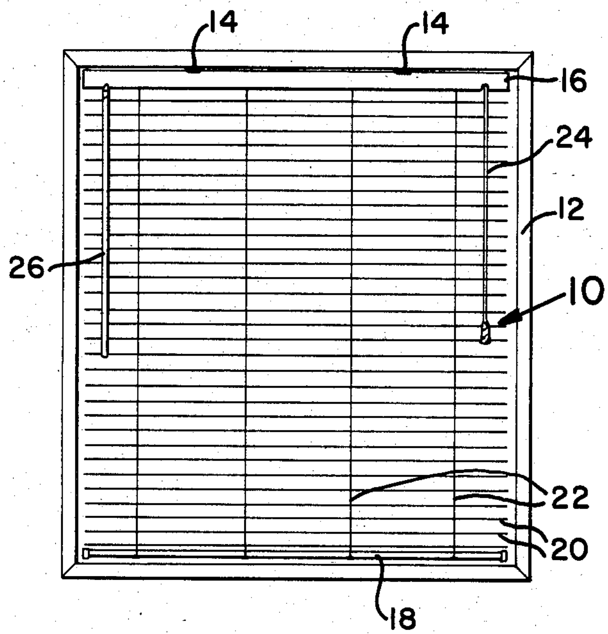
FIG. 1 is a front view of a venetian blind installed in a window frame by means of installation brackets designed in accordance with the present invention.

Referring now to the drawing in detail, FIG. 1 is a front view of a venetian blind mounted in a window frame. More specifically, the venetian blind generally designated with reference numeral 10 is mounted in a window frame 12 by means of brackets 14 designed in accordance with the present invention. The venetian blind comprises, in the usual fashion, a head rail 16, a bottom rail 18 and a large number of slats 20 suspended between the head and bottom rails 16, 18 by means of ladders 22. Lifting and lowering of the venetian blind can be accomplished by a lift cord 24, and tilting of the slats 22 by means of a tilting baton 26. All items described so far, with the exception of the installation brackets 14, are well known in the art and do not require any elaboration here.

Figure 7:
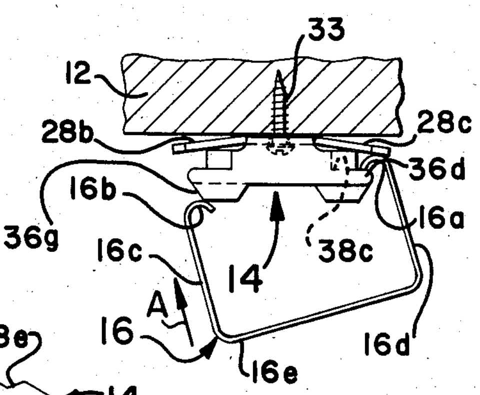
FIG. 7 illustrates the first step of the installation of a venetian blind head rail on an installation bracket fastened overhead according to the invention.
Figure 6:
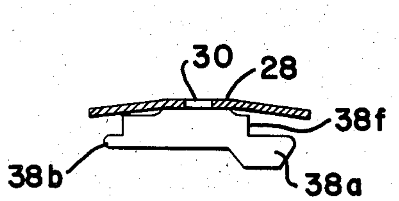
FIG. 6 is a section taken along the lines 6—6 of FIG. 5.
Figure 9:
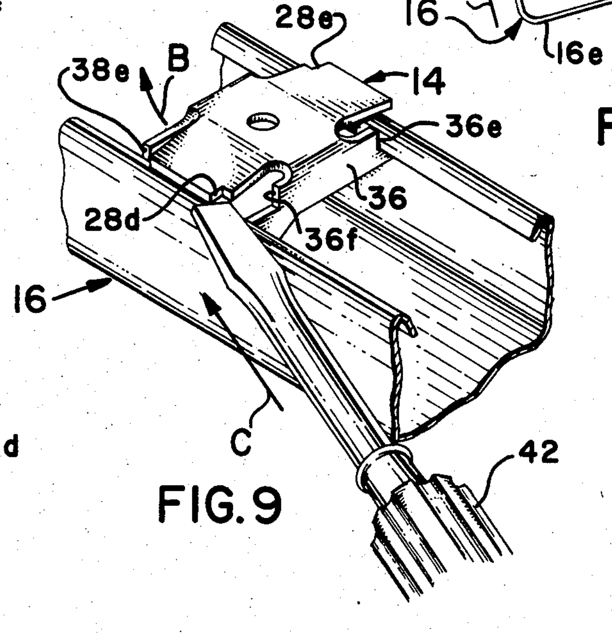
FIG. 9 is a perspective view illustrating how the head rail can be removed from the installation bracket.
Figure 8:
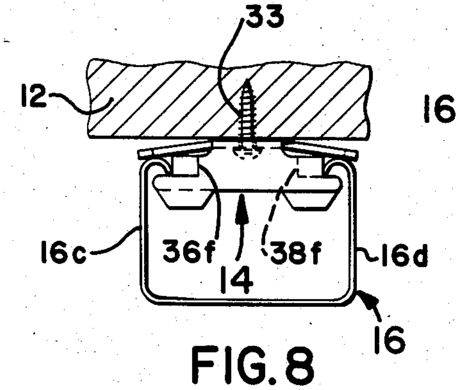
FIG. 8 shows the bracket of FIG. 7, with the head rail completely installed.

The installation bracket 14 according to the present invention is clearly illustrated in FIGS. 2 to 9. It consists of an integral sheet metal body 14. It should be kept in mind, however, that instead of sheet metal another appropriate material could be used, or that the same could be made in several parts. The body of the bracket 14 comprises a top portion 28 provided with a bore 30 through which a short screw 32 may be passed for fastening the bracket to a support 34 shown in FIGS. 2 and 3. The bracket 14 may also be directly fastened to the window frame 12 by means of a screw 33, as illustrated in FIGS. 7 and 8. It is, of course, self-understood that other means of support for the installation bracket may be provided depending on where the venetian blind head is to be installed, such as for instance, in a metal frame between two glass panes or a glass pane and a screen. The top portion 28 has a flat center 28*a* and two downwardly sloping front and rear portions 28*b* and 28*c*, respectively, on opposite sides of the center 28*a*. Diagonally opposite edges of portions 28*b* and 28*c* are notched at 28*d* and 28*e* respectively, for a purpose to be described later.

Figure 2:
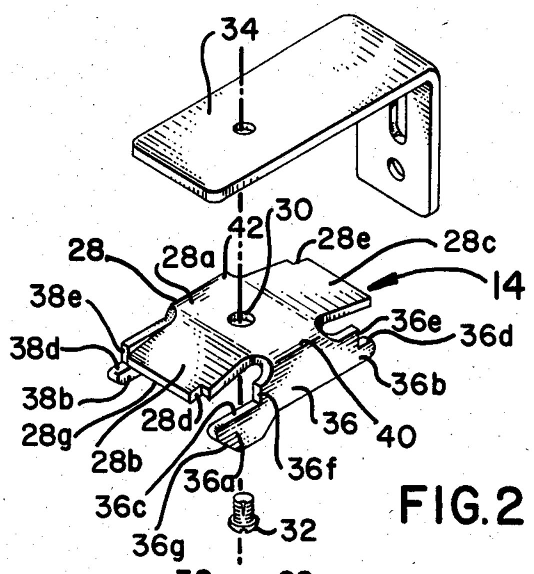
FIG. 2 is a perspective view of the installation bracket and a support therefor.
Figure 3:
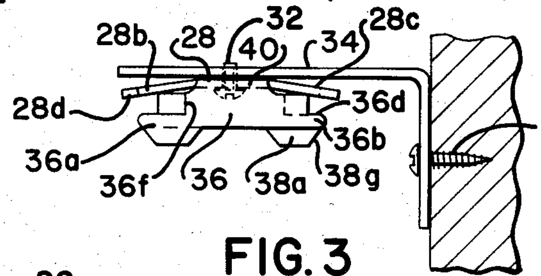
FIG. 3 is an end view of the installation bracket of FIG. 2.
Figure 5:
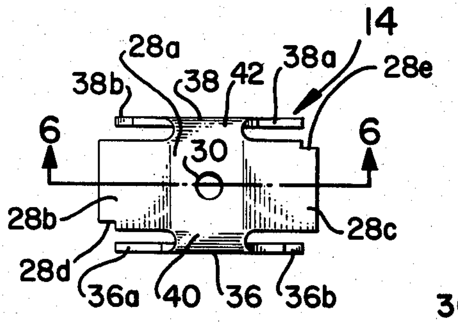
FIG. 5 is a top view of the installation bracket according to the present invention.
Figure 4:
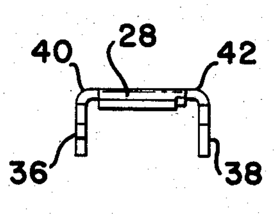
FIG. 4 is a front view of the installation bracket of FIG. 3.

The installation bracket 14 also includes two side portions 36 and 38, respectively, which are identical but are turned by 180°, as is visible in FIGS. 2 and 3. Side portions 36 and 38 depend from top portion 28 by intermediate bent portions 40 and 42, respectively. Side portion 36 ends in two outer edges or tips 36*a* and 36*b* respectively of different shape. The other side portion 38 is identical in design but is turned by 180°, i.e. the outer edge or tip 38*b* is diagonally opposite to tip 36*b*, and tip 38*a* is diagonally opposite to tip 36*a*. Tip 38*a* is not visible in FIG. 2, but in FIG. 3.

As will be evident from FIGS. 7 and 8, the installation bracket 14 may be fastened to a support, such as a window frame 12, by screw 33. Alternatively, it can be fastened to a bracket 34, which in turn may be connected to a portion of a window frame. Thereafter, the venetian blind head rail 16 can be snapped onto the installation bracket 14 by first placing one of its flanges, such as rear flange 16*a*, on the bracket so that it is placed between the sloping portion 28*c* and edges 36*d* and 38*c* (see Fig.2). By pressing the opposite side, front side 16*c* of head rail 16, upwardly as indicated by the arrow A in FIG. 7, the opposite flange 16*b* will ride up on the upwardly, outwardly inclined edge 36*g* of side portion 36 until it snaps into place between sloping portion 28*b* and edges 36*c* and 38*d*.

It will be understood that the bracket 14 is universal, that is it can be turned either way. Thus, the head could be hung first on the front tips 36*a* and 38*b* and then snapped over edges 36*d* and 38*c*.

The flanges 16*a* and 16*b* of the head rail are now fixed between edges 36*e* and 38*e* of the bracket, against accidental rotation and rest on edges or shelves 36*c*, 36*d*, 38*c* and 38*d*. However, the diagonally opposite edges 36*f* and 38*f* are sufficiently spaced apart from the flanges 16*a* and 16*b* respectively that if the head rail is to be removed, bracket 14 can be rotated slightly, as indicated by arrow B in FIG. 9, by pushing a screwdriver 42 against notch 28*d* (or 28*e*), in the direction of the arrow C.

As will be appreciated from FIG. 1 the brackets 14 are practically invisible except for the edge 28*g* of the sloping portion 28*b* in FIG. 2 and they fasten the head very close to the top of the window frame. As is clearly shown in FIG. 8 the bracket does not extend beyond the front or back sides 16*c*, 16*d* of the venetian blind head 16.

Also, the installation bracket may be used where there is very little or no space left between the end of the venetian blind head 16 and the window frame 12. In such a situation regular installation brackets could not be used because there would be insufficient room to swing open a cover of the bracket or pull out a latch of the bracket.

Furthermore, the bracket can be connected to the frame, or a support bracket, at any convenient location before the head is installed on the brackets 14. This is much easier than holding the blind head in the frame and driving a screw through the head. No holes are required in the bottom 16*e* of the head rail to provide access to the screws 32 or 33.

I claim:

1. For use in combination with a head rail of a venetian blind, said head rail being of essentially U-shaped cross section and having a bottom, two parallel spaced apart substantially vertically extending side walls with flanges extending inwardly from upper ends of said side walls to form flange edges: a bracket for mounting said head rail to a support, said bracket comprising:

a relatively flat top portion with means for fastening said top portion to said support and having opposite ends adapted to respectively at least partially cover said flanges outwardly of said flange edges;

and first and second spaced apart essentially parallel side portions depending from said top portion; each side portion having first and second opposite ends with outer edges spaced apart a distance smaller than the distance between said side walls but greater than the distance between said flange edges, the first and second ends of said first side portion being respectively turned by 180° with respect to the first and second ends of said second side portion, each first end having a first substantially horizontally extending edge forming a supporting shelf for one of said flanges and a second edge substantially perpendicular to said first edge thereof for guiding said one flange horizontally, each second end having a first edge essentially aligned with said first edge of said first end for forming a supporting shelf for the other flange and a second edge substantially perpendicular to said first edge thereof, said second edges of said second ends being spaced further from their respective outer edge than the second edges of said first ends are from their respective outer edge so as to leave a gap between said second edges and the respective adjacent flange edge;

whereby said top portion can first be fastened to said support; one of said flanges can be suspended below one end of said top portion on said first end of one side portion and said second end of the other side portion; and said head rail can then be swung about said flange edge of said one flange; and said other flange can then be forced over said second end of said one side portion and said first end of the other side portion and placed below the other end of said top portion on said second end of said one side portion and said first end of said other side portion.

2. The bracket according to claim 1, wherein at least one of said ends of said top portion is provided with means for engagement by a tool for rotating said bracket relative to said support and said head rail when said head rail is to be removed from said bracket and support.

3. A bracket according to claim 2, wherein said engagement means is a notch.

4. A bracket according to any one of claims 1 to 3, wherein each of said second ends is provided with an upwardly, outwardly inclined edge for facilitating movement of the flange edge when forced over the respective second end.

* * * * *